United States Patent [19]

Oliver

[11] Patent Number: 4,489,220

[45] Date of Patent: Dec. 18, 1984

[54] TEST SET

[75] Inventor: Stewart W. Oliver, Venice, Calif.

[73] Assignee: International Teldata II Corp., Los Angeles, Calif.

[21] Appl. No.: 502,227

[22] Filed: Jun. 8, 1983

[51] Int. Cl.³ ............................................ H04M 11/00
[52] U.S. Cl. ................................ 179/2 AM; 179/175; 179/175.1 R
[58] Field of Search .................. 179/2 AM, 2 A, 2 C, 179/175, 175.1 R, 175.2 R, 175.2 C, 175.3 R; 324/74, 75; 340/870.02, 870.03, 514–516, 635, 637

[56] References Cited

U.S. PATENT DOCUMENTS

| | | | |
|---|---|---|---|
| 2,938,165 | 5/1960 | Grieg | 324/74 |
| 3,787,810 | 1/1974 | Wiggins et al. | 179/175 |
| 3,800,090 | 3/1974 | Matena | 179/2 AM |
| 3,922,490 | 11/1975 | Pettis | 179/2 AM X |

Primary Examiner—Gene Z. Rubinson
Assistant Examiner—W. J. Brady
Attorney, Agent, or Firm—Wagner & Bachand

[57] ABSTRACT

A test set designed for testing meter reading units as well as telephone line connections for automatic utility meter reading systems. The test set is capable of simulating the meter reading apparatus when testing the telephone line and of simulating the telephone line when testing the meter reading components. The test set further simulates the receiving apparatus in the central office to test the combination of the meter reading apparatus and the telephone line. The test set is self powered by batteries or may be powered from conventional AC outlets. The test set is operative both in the telephone plant and in the field.

26 Claims, 15 Drawing Figures

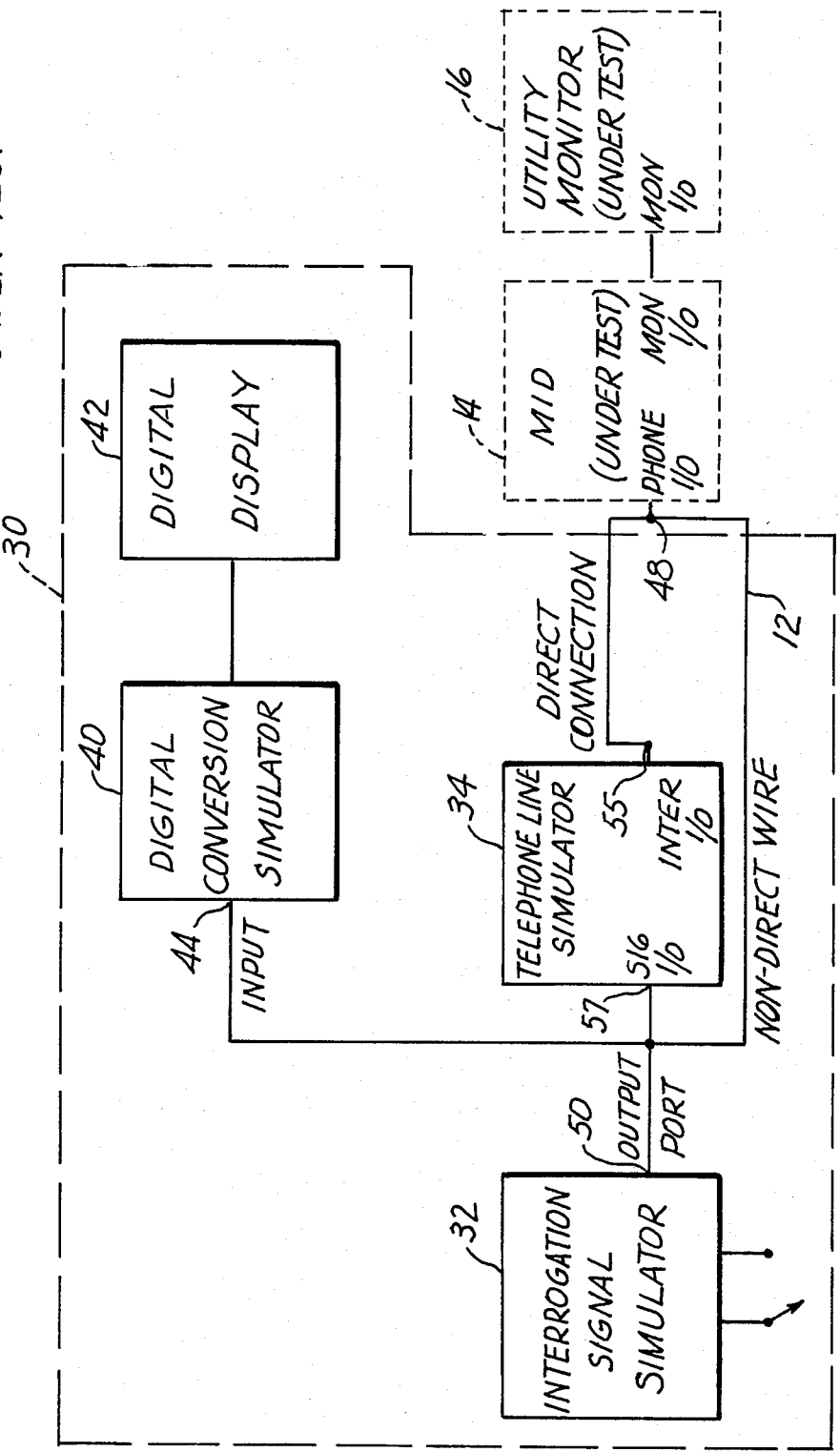

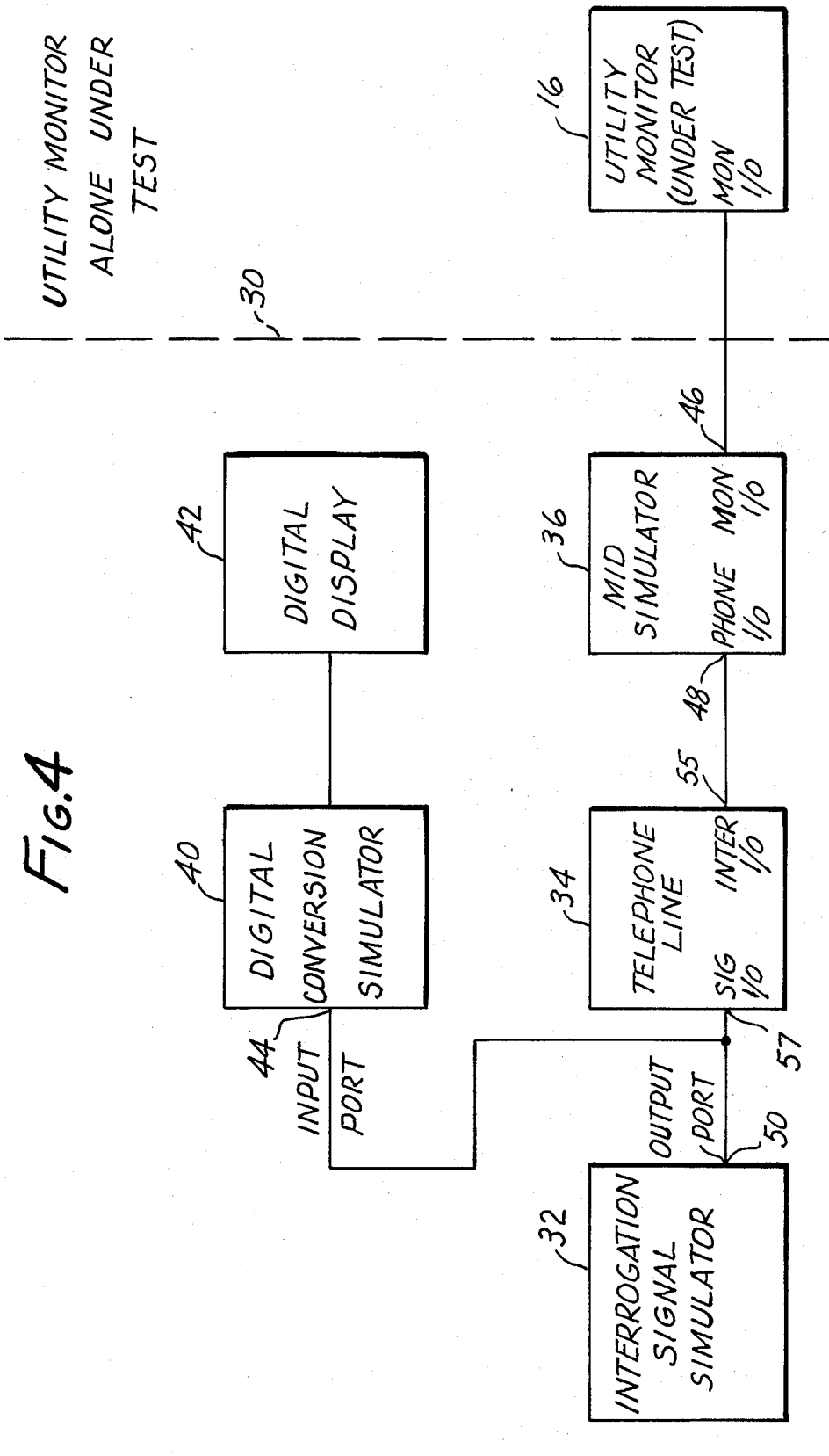

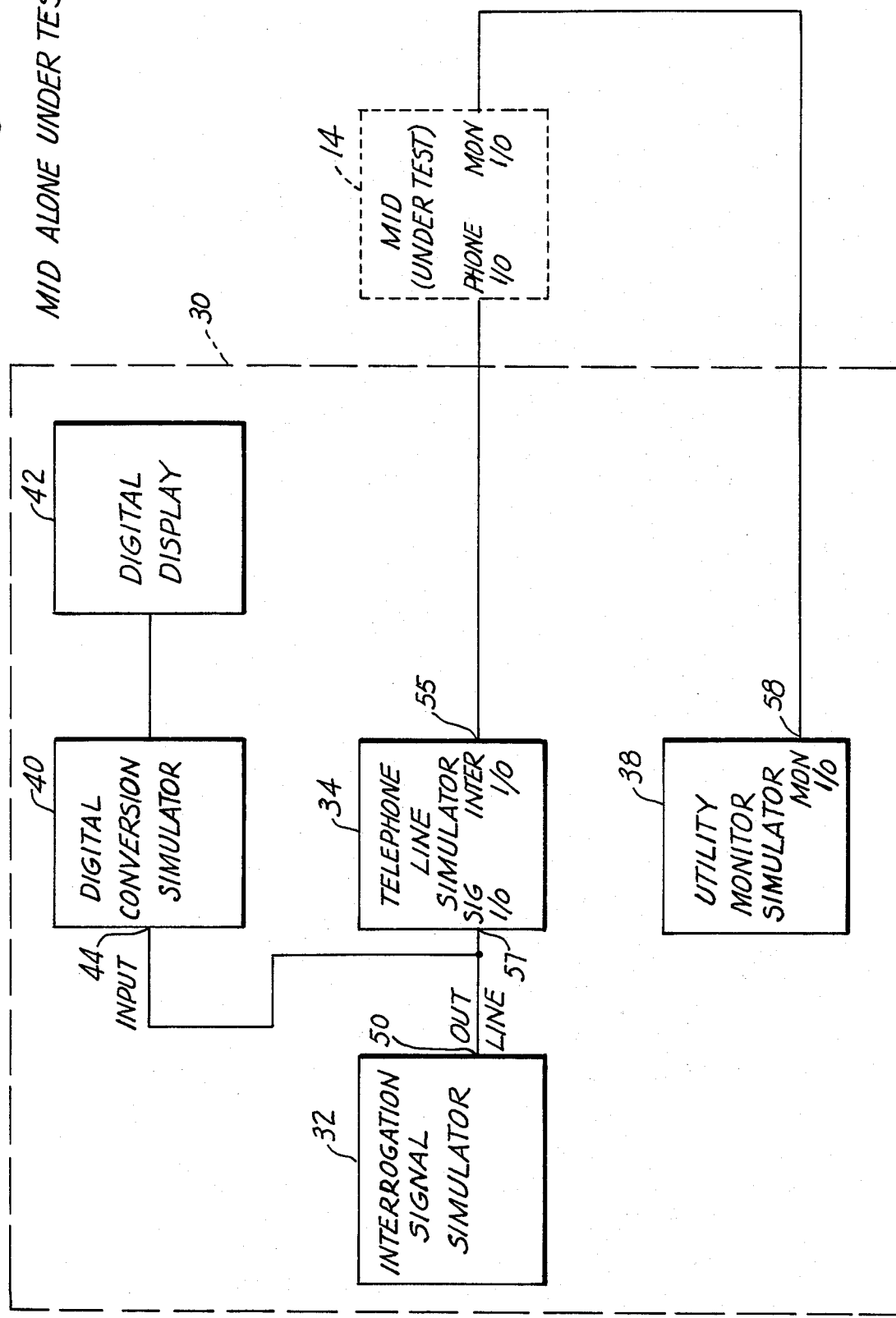

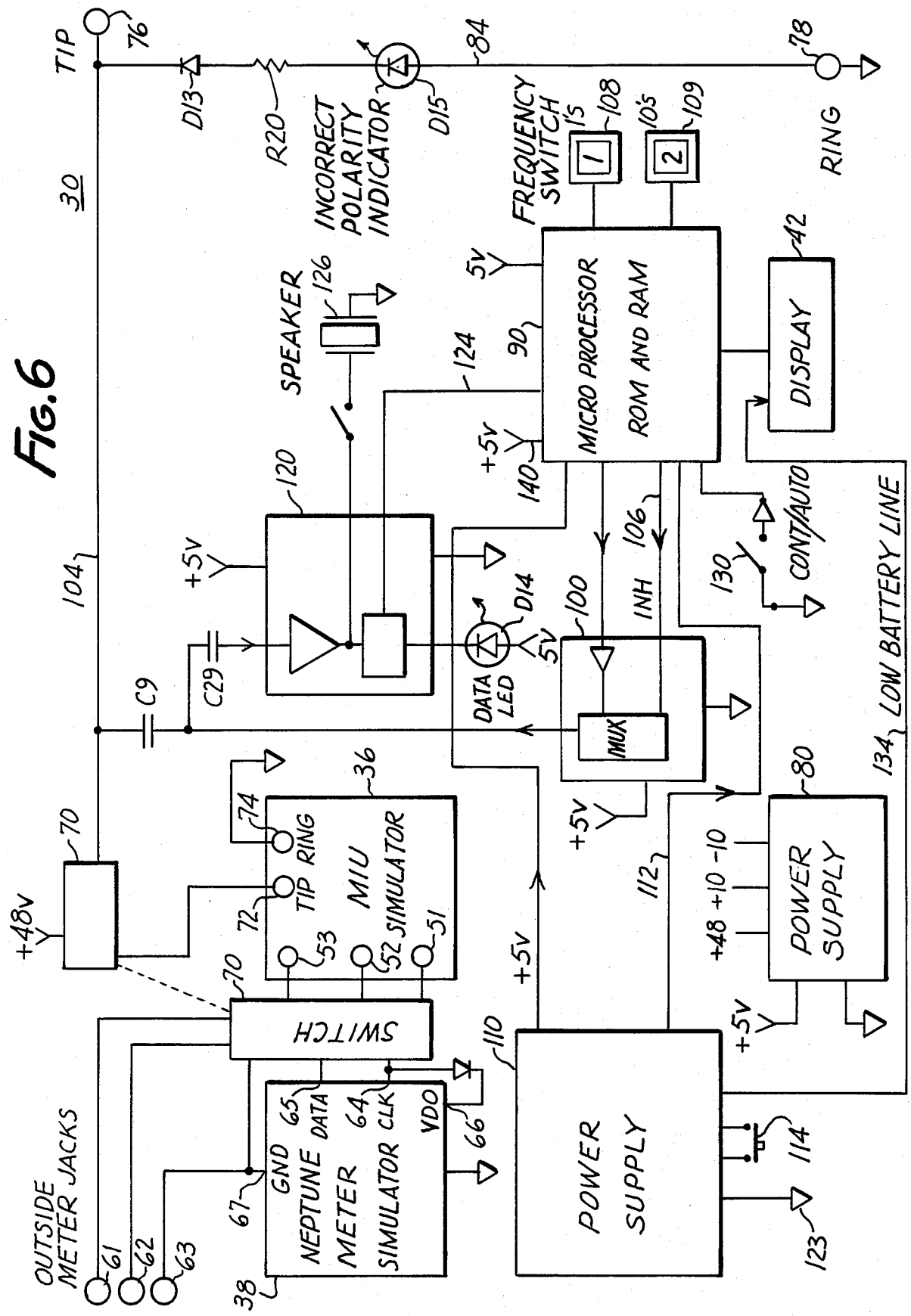

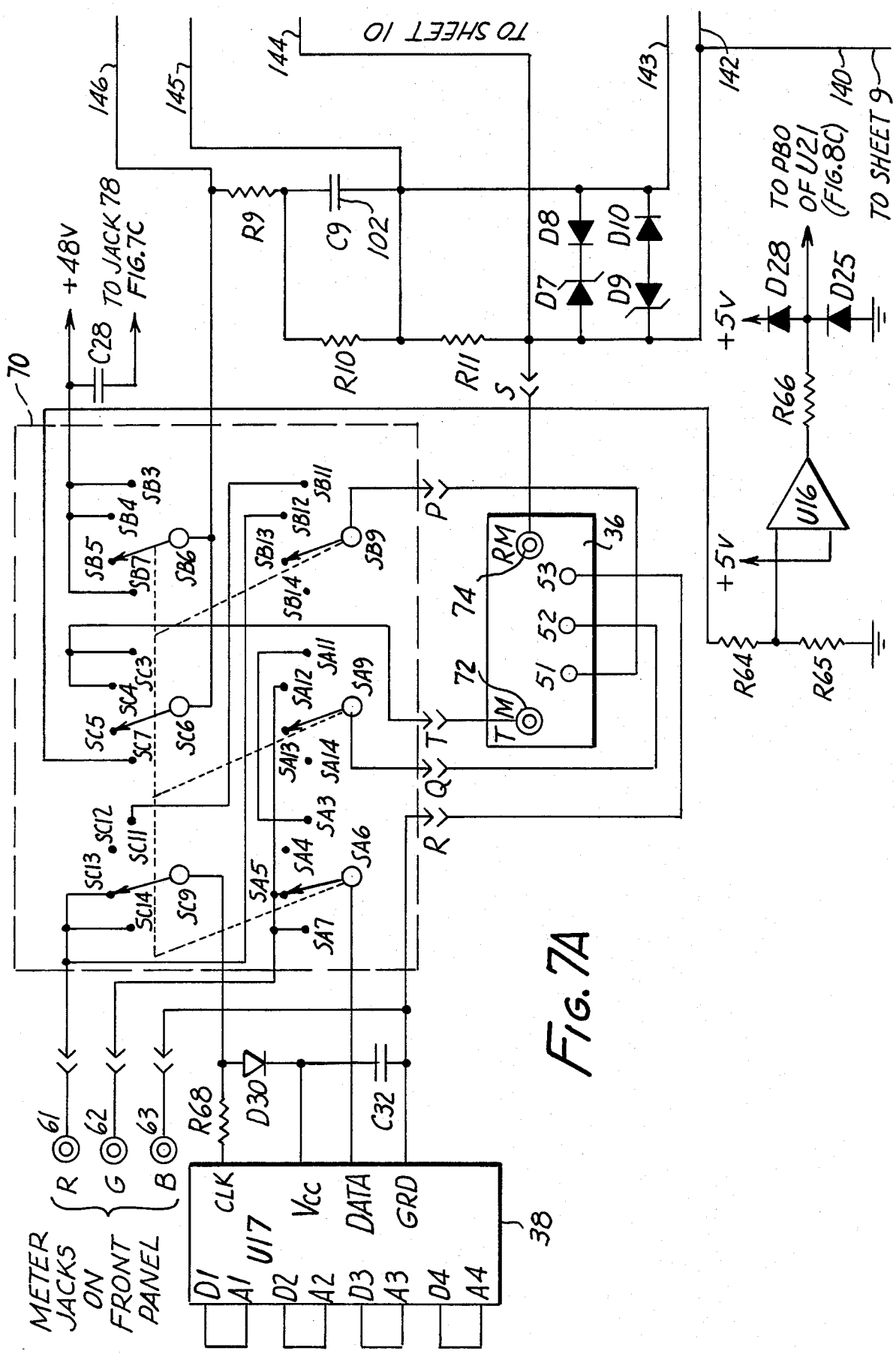

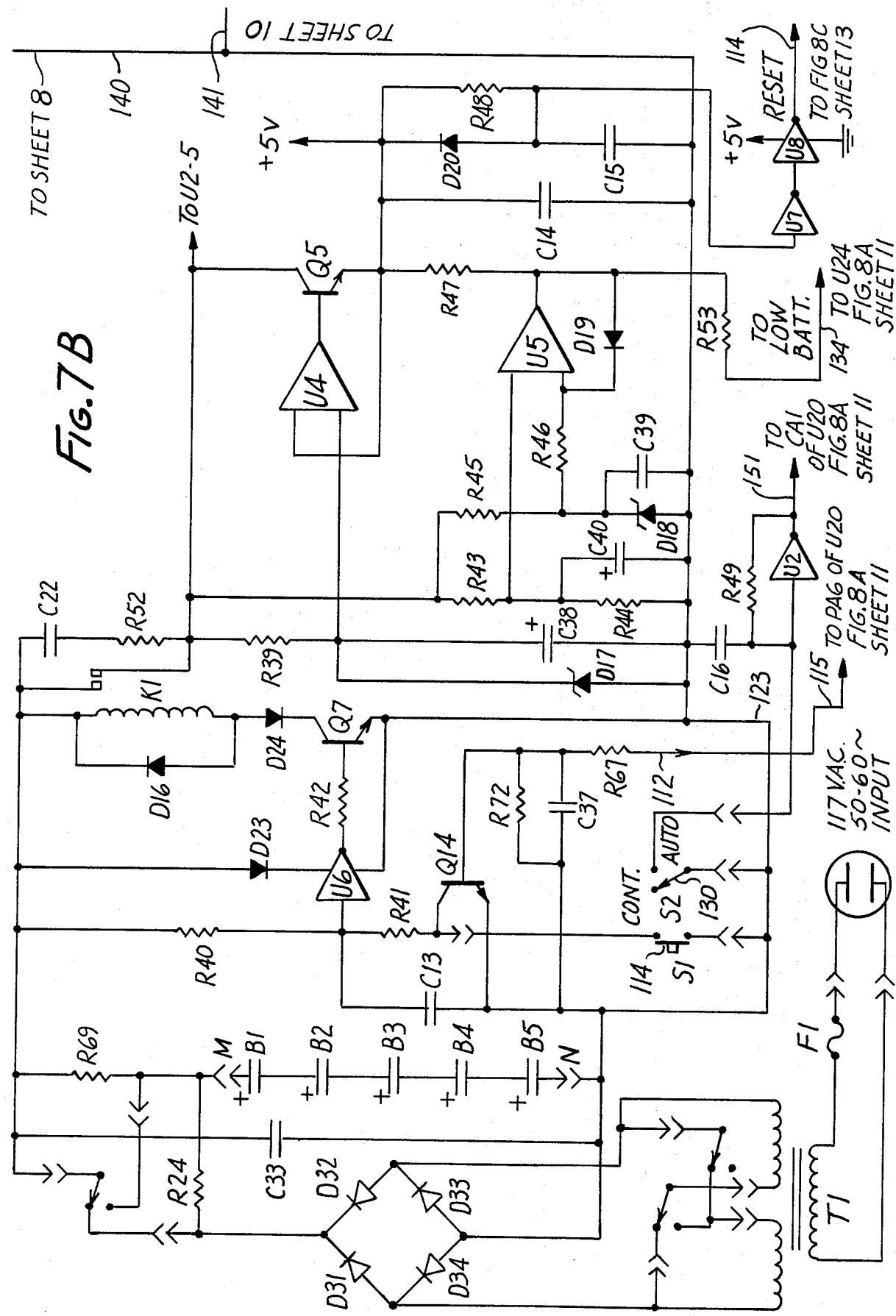

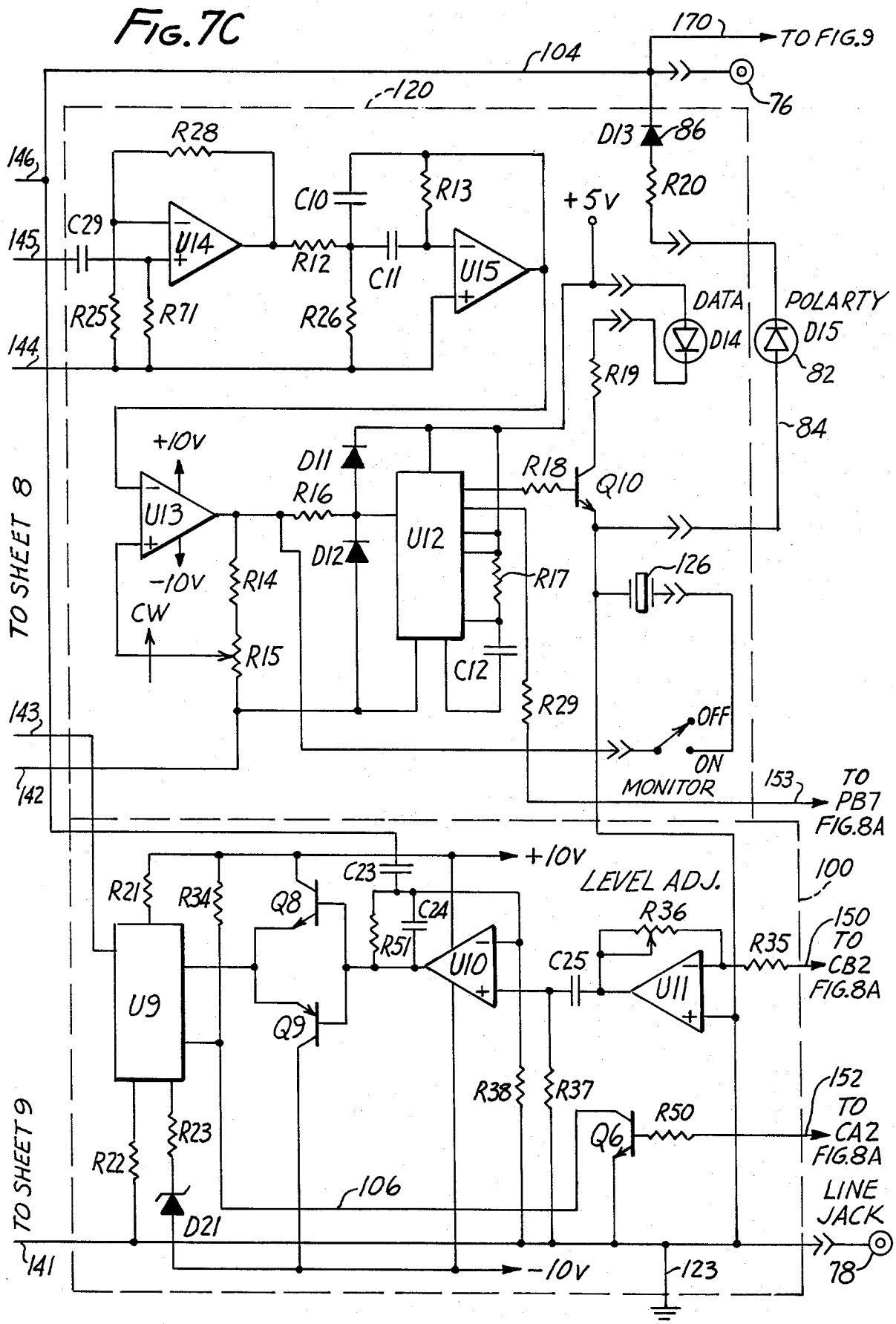

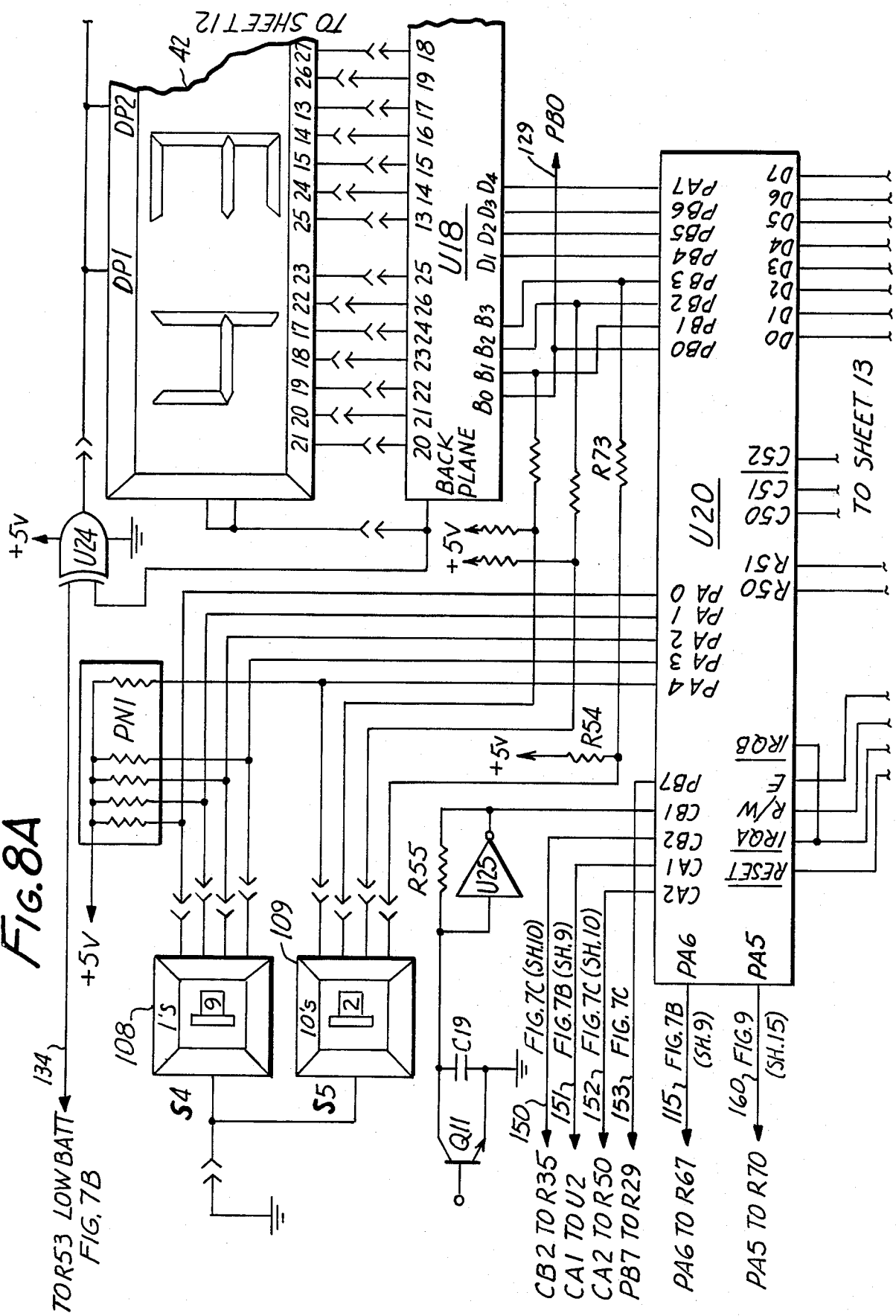

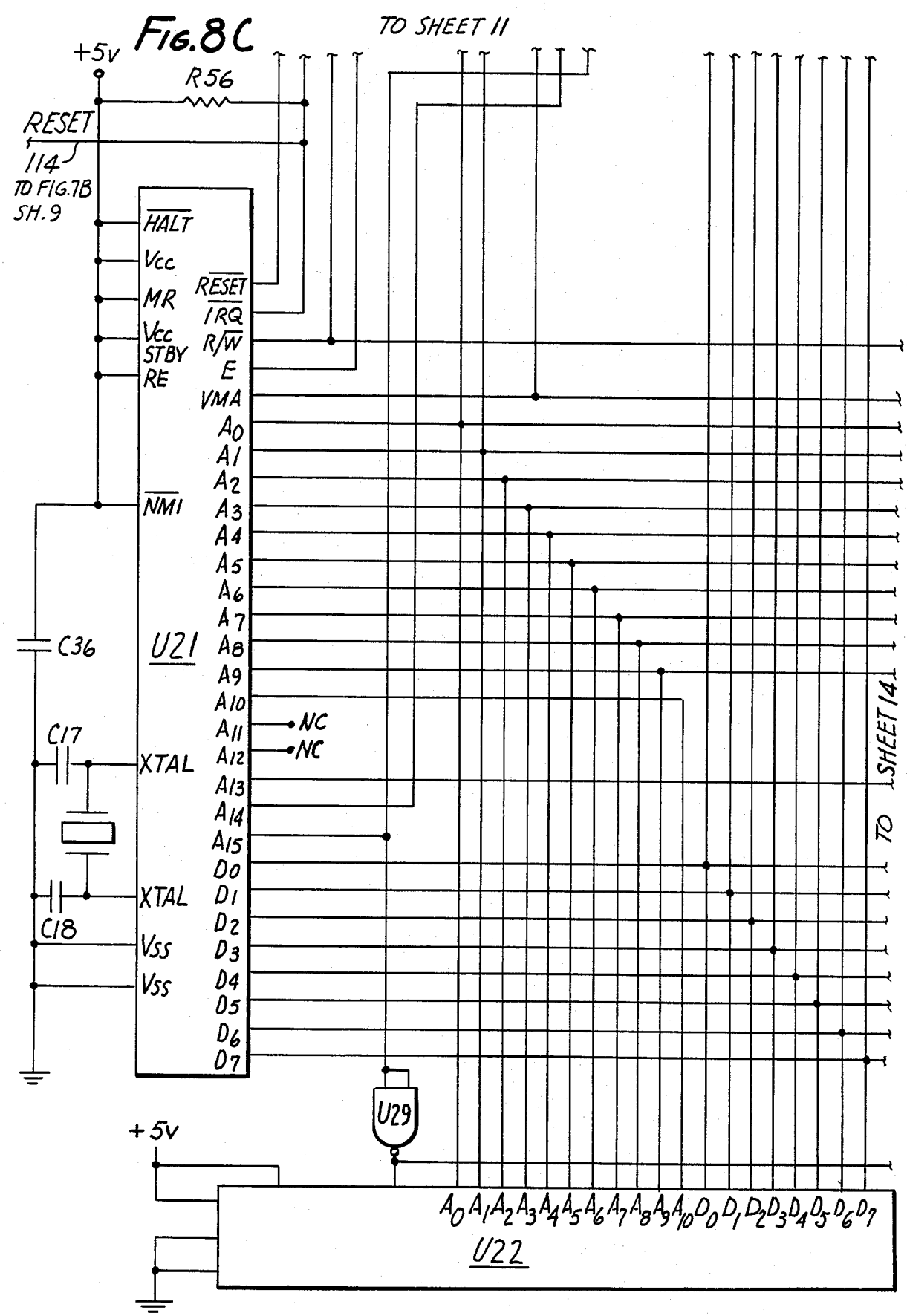

TEST SET

BACKGROUND OF THE INVENTION

The present invention relates to test equipment for testing multiple functions of telephone line communication equipment and more particularly with testing telephone line communication equipment which comprise an automatic utility meter reading system which interrogates a utility meter interface device over telephones lines which, in turn, communicates utility usage data by sending a series of pulses of an audio tone over the telephone line.

The test apparatus of the present invention can best be understood by referring to co-pending applications Ser. No. 543,372, filed Oct. 19, 1983 for A Centerpoint Automatic Meter Reading System, Ser. No. 544,110, filed Oct. 21, 1983 for A Multiplexer System for an Automatic Meter Reading, and Ser. No. 502,201, filed June 8, 1983 for A Meter Interfacing Unit for Utility Meter Reading System. These co-pending applications describe in detail an automatic meter reading system for which the present test apparatus is particularly suited. Such an automatic meter reading system employs a multiplexing system which multiplexes signals on a plurality of telephone lines in a central location. The multiplexing system sends out interrogate signals over the plurality of telephone lines which are received by meter interface devices connected to the individual telephone lines, These meter interface devices, in response to receiving a particular distinct interrogation signal from the multiplexing system, send utility usage data over the telephone line to which they are connected. The utility usage data is received from a utility metering device which monitors the usage of such commodities as water, electricity or gas.

A serious need existed to test any of the component parts of such automatic meter reading systems for proper or improper operation including the central telephone office equipment, the line communications channel and the subscriber installations. In order to test the component parts of the system completely with the present invention, the present invention must be able to simulate the functions of several of the components in the system. Thereby, any suspected component or components can be tested using only the present invention for the testing.

To simulate the component parts of the automatic meter reading system requires that a test system be able to simulate a telephone line which includes the normal voltage found on a telephone line, for example, ON-HOOK, non-ringing voltage, plus the frequency response of a telephone line to audio tones or other signals sent over it. Also, such a test system must be able to simulate the operation of the subscriber's utility meter reading apparatus including the utility meter's configuration of sending usage data to the meter interface device responsive to commands therefrom. As well, a suitable test set must be able to simulate the operation of the meter interface device including responding to a particular distinct interrogation signal over a telephone line and the consequent sending of the utility usage data received from the utility meter. In addition, it is desirable that the test system be able to simulate the operation of any multiplexing system used including the sending of the interrogation signals and receiving the utility usage data. Of course, the test set must be able to simulate any combination of the components parts of the automatic meter reading system.

There is test equipment which is intended to test for improper operation of telephone lines and telephone line equipment and there is test equipment which is used to test various functions of telephone communications equipment; but, there has been no known single piece of test apparatus which can test a subscriber's installation, a line and central office equipment from either end of the system. It is common to find test equipment which is dedicated to testing a particular function of piece of equipment, but, nowhere has it been known to put the equivalent of an entire automatic meter reading system in a single box so that the entire system can be tested from this single box as is done in the present invention.

Putting the equivalent of the entire automatic meter reading system in a single box gives the present invention its unique features. The test apparatus can completely test any combination of components of the automatic meter reading system and test all of its own internal functions by arranging the simulators of the individual functions in the same manner as the entire system would be arranged. Thus, a fool proof self-test can be performed.

SUMMARY OF THE INVENTION

The present invention is a test apparatus for testing automatic utility meter reading systems having component parts which monitor utility usage information, send interrogation signals over the telephone lines, send utility usage information over telephone lines responsive to the receiving of interrogation signals over the telephone lines, and receive the utility usage information from the telephone lines. The test apparatus of the present invention is for testing the component parts of an automatic utility meter reading system and comprises a first means for simulating the operation of the components of the automatic utility meter reading system which monitor the utility usage information; a second means for simulating the operation of the components which send the interrogation signals over the telephone lines; a third means for simulating the operation of the components which send utility usage information over the telephone lines responsive to receiving the interrogation signal; and, a fourth means for simulating the operation of the components which receive the utility usage information.

The components of the automatic utility meter reading system which monitor the utility usage information and send the information over the telephone line responsive to receiving the interrogation signal are typically at a subscriber's location and comprise a subscriber's installation. The components which send the interrogation signals and receive the utility information over the telephone lines are typically at a central location which is usually a telephone office.

The first, second and fourth means are interconnectable to test the operation of the components of the automatic utility meter reading system which send the utility usage information over the telephone lines responsive to receiving the interrogation signals. The second, third, and fourth means are interconnectable to test the components which monitor utility usage information. The second and fourth means are interconnectable to test the combination of components which monitor the utility usage information and send the utility usage information over the telephone lines responsive to receiving the interrogation signals.

The testing of each individual component of the automatic utility meter reading system is typically done by substituting simulations of all other components of the automatic utility meter reading system around the individual suspected component to complete an entire automatic utility meter reading system. The testing for proper operation in the various test configurations consists of sending an interrogation signal and attempting to read the conequential utility meter usage information. If the incorrect utility usage information is received or if no usage information is received, the suspected component or components are known to be inoperative.

There may also be a fifth means for simulating the operation of the telephone line with the first, second, third, forth and fifth means being interconnectable to test the test apparatus itself. The test apparatus may be tested by interconnecting itself so that an entire automatic meter reading system is simulated and a test of the simulated system may be made.

The test apparatus of the present invention may be used at the central location to test suspected installations at various subscriber's locations by connecting the test apparatus to the tip and ring of the discrete telephone line used by the suspected installation, by interconnecting the second and fourth means, and by sending an interrogation signal over the discrete telephone line and waiting for the consequential utility meter information to appear over the discrete telephone line.

The test apparatus may be test components of the automatic meter reading system whether these components are connected to the telephone line or not. Therefore, the test apparatus can test an installation of a meter interface device and utility usage monitor from a remote location by connecting the test apparatus to the telephone line at the remote location.

The test apparatus may have means for determining whether the alternating current representation signal from the suspected meter interface device is in any one of the following conditions: higher in voltage level relative to a predetermined range of acceptable levels, within the predetermined range of voltage levels which are acceptable levels, and lower in voltage level than the predetermined range of voltage levels.

The first means of the test apparatus may include a means for selectably producing any one of a plurality of single tone bursts as an interrogate signal to activate a particular meter interface device. There may also be a means for producing the single tone burst for a selectable length of time. The test apparatus may also include means for indicating the existance of a condition of a reversed tip and ring telephone line wires together with a means for preventing damage to the test apparatus, the tested telephone line, the meter interface device and the utility usage monitor from the reversed tip and ring telephone line wires.

The test apparatus may also include a means for indicating whether the suspected meter interface device is transmitting its usage figure or not together with a means for displaying the usage figure transmitted therefrom. If the internal utility monitor simulator of the fifth means is used, the test apparatus can, instead, display the usage figure transmitted by the internal utility monitor simulator.

BRIEF DESCRIPTION OF THE DRAWINGS

This invention may be more clearly understood from the following detailed specification and drawing in which;

FIG. 3 is an electrical block diagram of the test apparatus in an internal test configuration to test a suspected subscriber's installation including a combination of a meter interface device and utility usage monitor;

FIG. 4 is an electrical block diagram of the test apparatus in an internal test configuration to test a suspected subscriber's utility usage monitor;

FIG. 5 is an electrical block diagram of the test apparatus in an internal test configuration to test a suspected subscriber's meter interface device;

FIG. 6 is an electrical block diagram of the test apparatus of the present invention;

FIGS. 7a, 7b, and 7c comprise an electrical schematic diagram of the utility usage monitor simulator, meter interface simulator, data indicator circuit, incorrect polarity indicator circuit and power supply of the present invention;

FIGS. 8a, 8b, 8c and 8d comprise an electrical schematic diagram of the microprocessor and display of the present invention; and, FIG. 9 is an electrical schematic diagram of the high/low voltage level indicator circuit of the present invention.

DETAILED DESCRIPTION OF THE INVENTION

Figure 1:
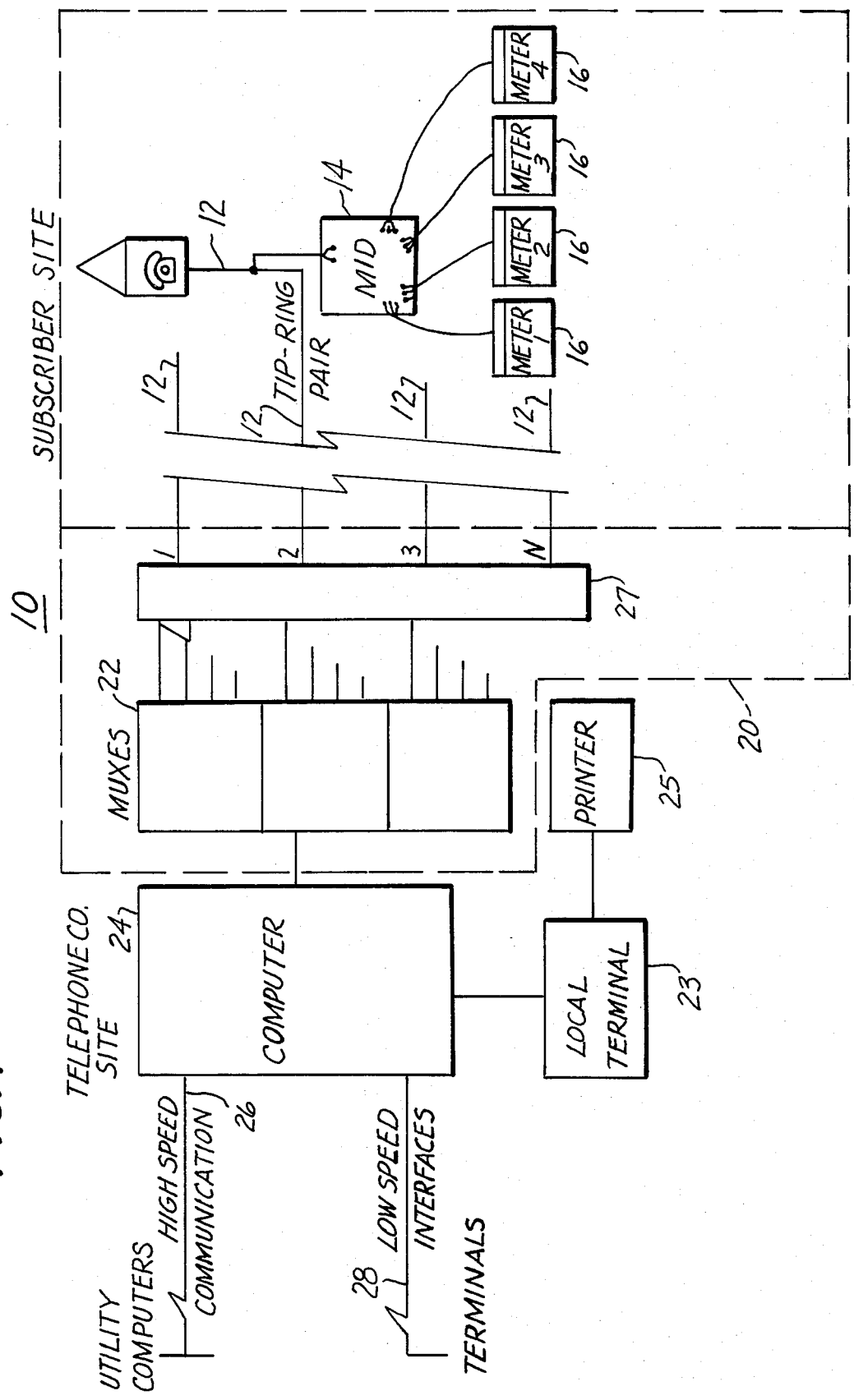
FIG. 1 is an electrical block diagram of an automatic utility meter reading system for which the present invention is particularly suitable to test.

Referring to FIG. 1, the present invention is particularly suited to test the component parts of an automatic utility meter reading system 10, similar to one described in the above identified co-pending application A Centerpoint Automatic Meter Reading System. In the automatic utility meter reading system 10, each of N number of subscriber's telephone lines 12 are connected to at least one meter interface device 14, similar to one discussed in detail in the above identified co-pending application for A Meter Interfacing Unit for Utility Meter Reading System. The meter interface devices 14 are typically designed to respond to a particular distinct interrogation signal sent over the telephone line and, in turn, command a usage figure from utility usage device 16 which is sent in the form of an alternating current representation over the same telephone line. A meter interface device (MID) 14 may have one or several utility monitoring devices 16 which can send a usage figure to the meter interface device 14 upon receiving a command therefrom. A typical utility monitoring device (UMD) 16 for monitoring water usage can be seen in U.S. Pat. No. 4,085,287 to Kullman et al, the disclosure of which is incorporated by reference herein and one should refer thereto for a complete understanding of this typical UMD 16.

The MID's 14 connected to the individual subscriber's telephone lines 12 are each sensitive to receiving a particular distinct interrogation signal from a multiplexer system 20, similar to one described in co-pending application for A Multiplex System for Automatic Meter Reading. When a particular interrogation signal is received over an subscriber's line 12, the MID 14 commands a usage figure from one of its UMD's 16 which is then converted and sent over the subscriber's line 12. It can be seen that numerous meter readings can be sent over a plurality of telephone lines in the automatic utility meter reading system 10.

The plurality of subscriber's lines 12 are multiplexed both for the sending of the plurality of interrogation signals and for the receiving of the plurality of meter readings in the multiplexer stage 22 of the typical multiplexing system 20. The multiplexer stage 22 is typically connected to the telephone lines 12 through the telephone line relay terminal housing 27. The meter reading data is sent to a computer 24 which can assemble and compile the plurality of usage figures into billing information. Since the multiplexing system 20 is typically in a central telephone office, the billing information or the meter readings alone may be sent to a utility company by high or low speed data lines 26 and 28. The billing information or meter readings can be displayed and the computer 24 controlled by a local terminal 23 and printed on a local printer 25, both located in the telephone company central office.

TEST CONFIGURATIONS

Figure 2A:
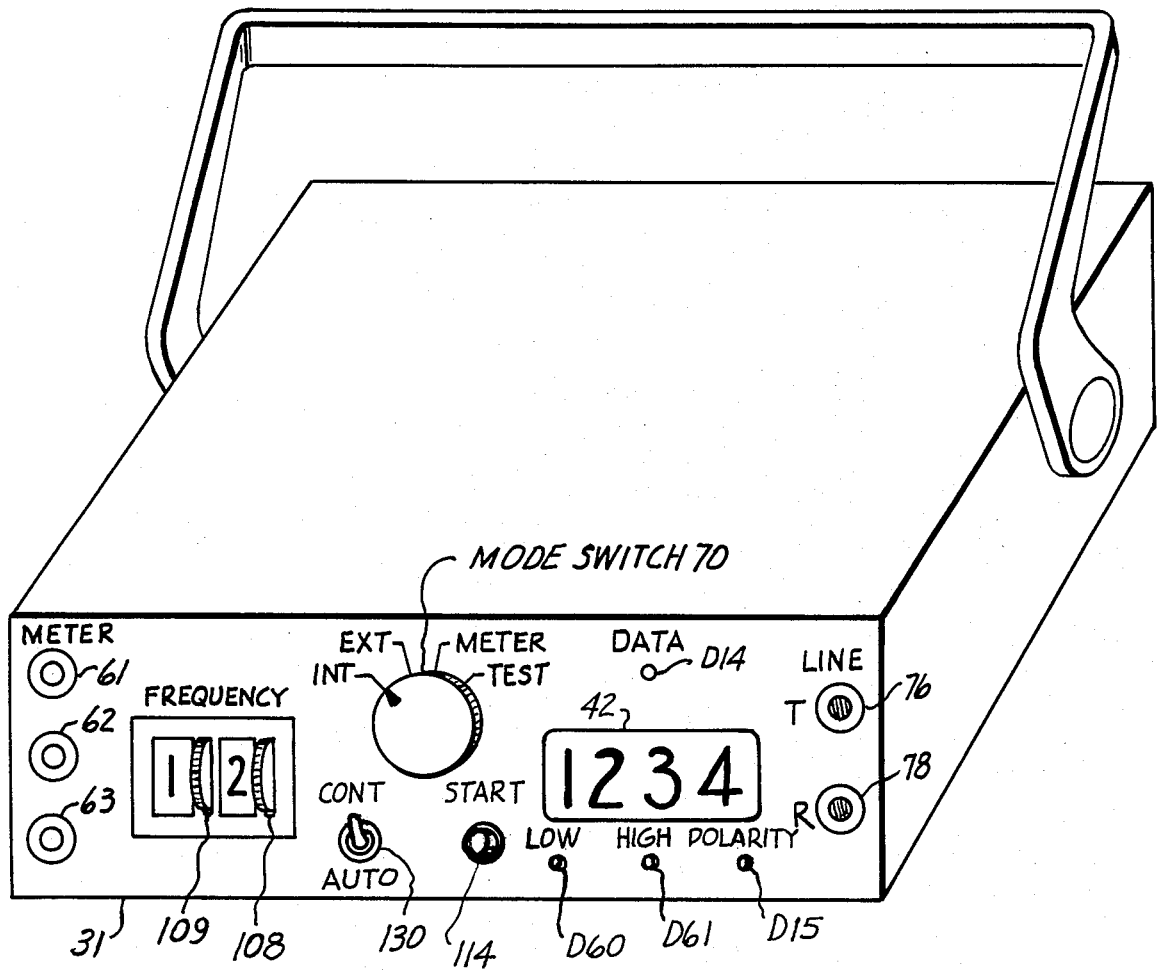
FIG. 2a is a perspective elevational view of the typical configuration of the test apparatus which may be used in the field or at the telephone office.

Referring the FIG. 2a, the test apparatus 30 is typically housed in a box 31 which is portable for field use. The modes of testing are selected by a mode switch 70, seen in its INTERNAL position. The test apparatus 30 also has a display 42 which can display UMD 16 readings or readings from the internal UMD simulator 38 of FIG. 2b. Also, the particular interrogation signals can be chosen with the two frequency switches 108 and 109. The UMD 16 of FIG. 1 can be connected to the test apparatus 30 at terminals 61, 62, and 63. A MID 14 or telephone line connected to a particular MID 14 can be connected to the test apparatus 30 through external tip 76 and ring 78 terminals. The test apparatus 30 can be started in its testing by start switch 114 which will keep the test going for a predetermined period of time and then shut-off or it will keep the test on continuously depending on whether switch 130 is in the auto or continuous position respectfully.

Figure 2B:
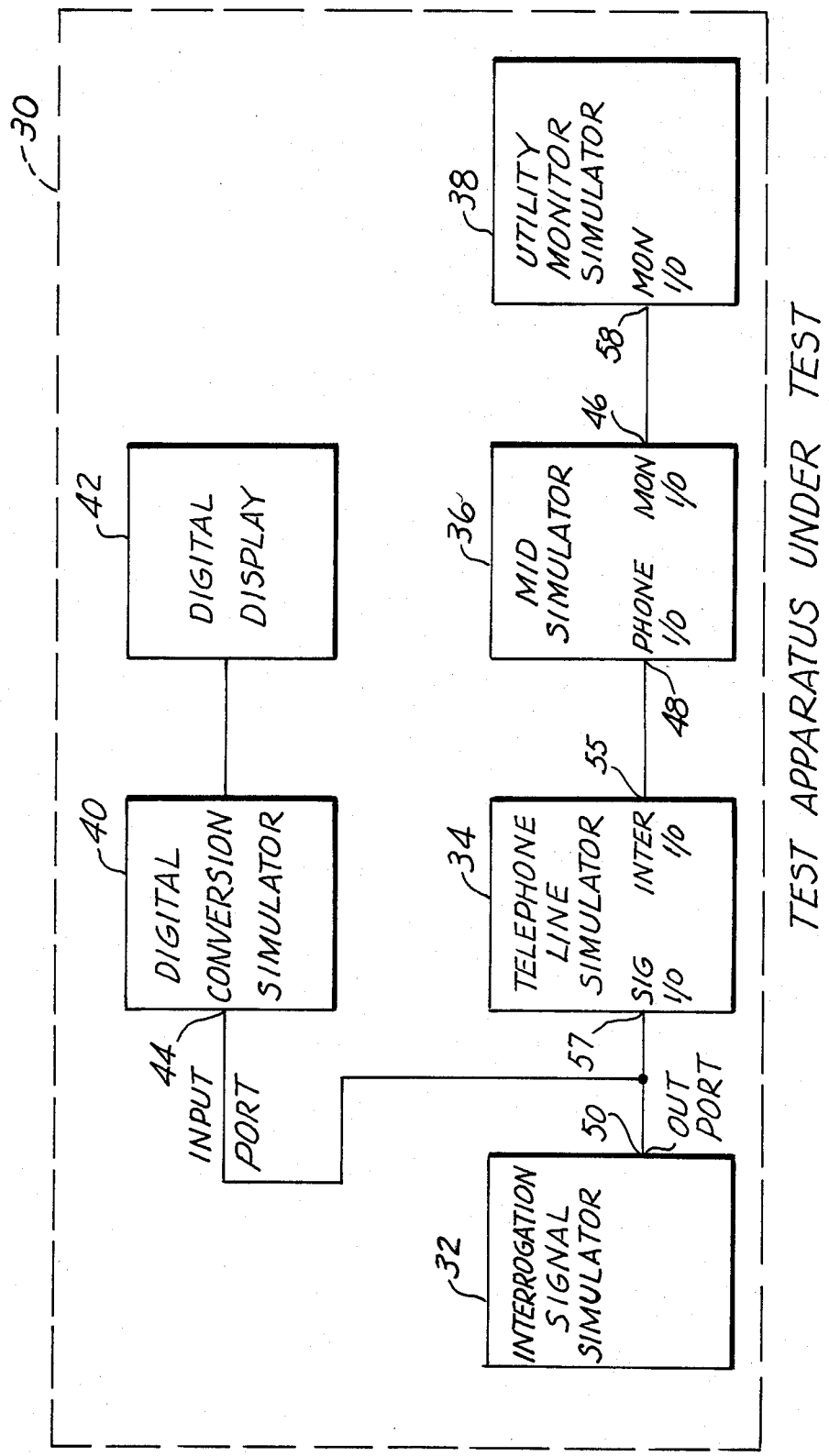
FIG. 2b is an electrical block diagram of the test apparatus in an internal test configuration to enable a self-test of the test apparatus.
Figure 8B:
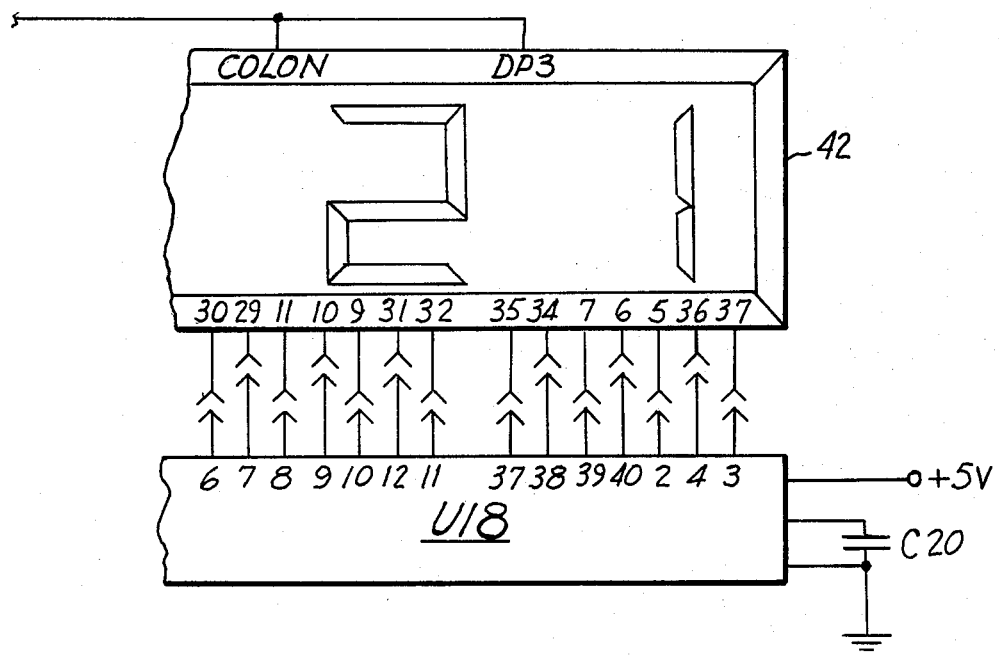
Figure 8D:
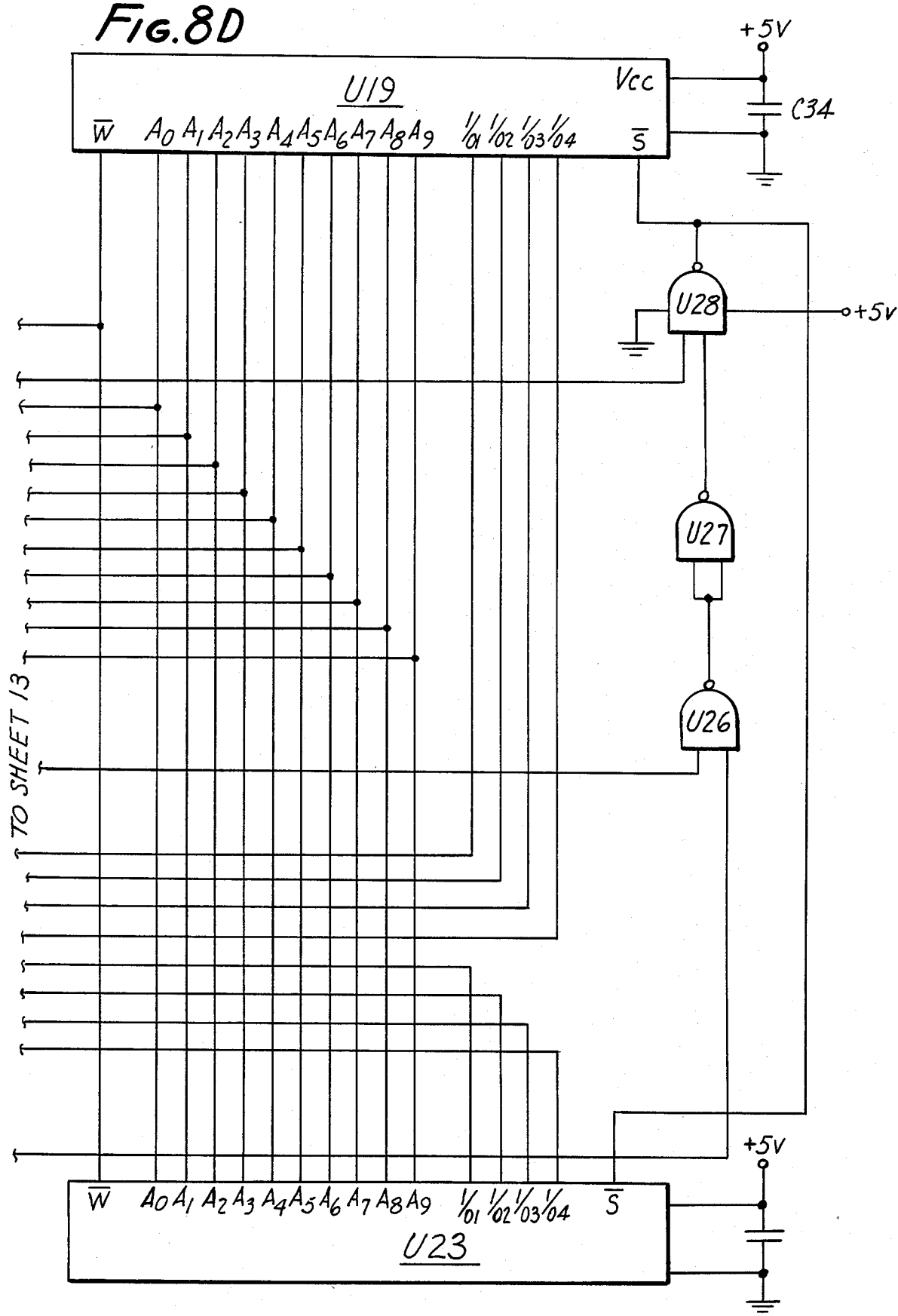

When data is transmitted either by an MID 14 or the internal MID simulator 36 of FIG. 2b, the data LED D14 will light for the duration of the plurality of pulses comprising the transmitted usage figure. Also, LED's D60 and D61 can indicate whether the voltage level of the alternating current representation signal from the MID 14 is lower or higher, respectfully, than a predetermined proper voltage range.

Referring to FIGS. 2a and 2b, the present invention is a test apparatus 30 particularly suited for testing the components of the automatic utility meter reading system 10 of FIG. 1. Unlike previous test equipment, the test apparatus 30 of the present invention can test any component and any combination of components of the several types of automatic utility meter reading systems. It does this by having the ability to simulate operations of the system and the ability to selectively interconnect any of the simulated operations.

The test apparatus 30 can simulate the operations of sending of interrogation signals, for example a burst of a single audio tone, over the subscriber's lines 12 of FIG. 1 in the interrogation signal simulator 32. The interrogation signal simulator 32 typically comprises a microprocessor circuit 90 and a interrogation signal interface 100, both seen in FIG. 6, which generate a particular interrogation signal responsive to the settings of frequency switches 108 and 109, seen in FIGS. 2a and 6. The generated interrogation signal, which is typically a burst of a single tone of predetermined duration and of frequency determined by the setting of switches 108 and 109 of FIG. 2a, is sent on to either the internal MID simulator 36 or the external tip 76 and ring 78 terminals to be connected to a suspected MID 14.

The operations of the subscriber's telephone line 12 can be simulated in the telephone line simulator 34; the telephone line simulator typically comprises a line 104, ground connection 123 and a power supply 80 providing a source of +48 and −48 volts as seen in FIG. 6. The voltage impressed on line 104 and ground 123 simulates the voltage found on a telephone line in the ON-HOOK, non-ringing condition and the line 104 and ground 123 conduct audio signals similar to a standard telephone line 12.

The operation of the MID 14 of FIG. 1 can be simulated in the MID simulator 36. The MID simulator 36 typically comprises a MID 14 itself which can be switched into or out of a particular test configuration depending on whether the MID simulator 36 is needed for a particular test.

The UMD 16 of FIG. 1 can be simulated in UMD simulator 38; the UMD simulator 38 typically comprises, in the case of a UMD 16 of the type described in U.S. Pat. No. 4,085,287, an integrated circuit which comprises the circuitry shown in FIG. 5 of the above mentioned patent. This integrated circuit is wired to set the reading at a particular value which ordinarily would have been chosen by switch settings.

Finally, the digital conversion of the meter readings sent over the subscriber's line 12 can be simulated in the digital conversion simulator 40 which typically includes a display 42. The digital conversion simulator 40 typically comprises a usage data interface 120 of FIG. 6 which receives the alternating current representation from the MID 14 or MID simulator 36 over line 104 and sents it to microprocessor 90 of FIG. 6 for digital conversion.

CONFIGURATION I—SUSPECTED INSTALLATION TEST

Referring to FIG. 3, a combination of a suspected MID 14 and UMD 16 may be tested. In the field test, first test configuration, the output port 50 of the interrogation signal simulator 32 is connected to the signal input/output port 57 of the telephone line simulator 34; the interface input/output port 55 of the telephone line simulator 34 is connected to the phone input/output port 48 of the suspected MID 14. Of course, the input port 44 of the digital conversion simulator 40 is connected in parellel to the output port 50 of the interrogation signal simulator 32 to receive the usage figure information. If the correct meter reading is displayed on the digital display 42 after an interrogation signal has been sent by the interrogation signal simulator 32, the MID 14 and UMD 16 are operating properly. If an incorrect reading or an error condition is found, either or both of the MID 14 and UMD 16 are operating improperly.

There is only one difference between the telephone office, first test configuration, and the field test version, that is, the test apparatus 30 does not use the telephone line simulator 34, instead it uses the subscriber's line 12 connected in parallel to the output port 50 of the interrogation signal simulator and the digital conversion simulator input port 44. Therefore, the test apparatus 30 in the telephone office first test configuration may test a suspected MID 14 and UMD 16 installation from the multiplexing system 20 which is typically at a remote, central location. This may be done by sending the interrogation signal over the subscriber's telephone line 12 which is connected to the suspected installation. The subscriber's telephone line 12 will power the internal MID simulator 36 of the test apparatus 30.

CONFIGURATION II—SUSPECTED UMD TEST

Referring to FIG. 4, a suspected UMD 16 alone may be tested by interconnecting the test apparatus 30 in a second test configuration where the output port 50 of the interrogation signal simulator 32 is connected to the signal input/output port 57 of the telephone line simulator 34; the interface input/output port 55 of the telephone line simulator 34 is connected to the phone input/output port 48 of the MID simulator 36; and, the monitor input/output port 46 of the MID simulator 36 is connected to the monitor input/output port of the suspected UMD 16. Of course, the input port 44 for the digital conversion simulator 40 is connected in parallel with the output port 50 of the interrogation signal simulator.

This second test configuration of the test apparatus 30 simulates all operations of the automatic utility meter reading system 10 except that of the UMD 16. Therefore, upon a manual prompting of the test apparatus 30, an interrogation signal from the internal interrogation signal simulator 32 will be sent to the internal MID 34, which, in turn, sends a command to the suspected UMD 16 asking for the usage figure. If a proper figure is sent by the UMD 16, it will be displayed on the display 42 after being sent through the meter interface simulator 36, telephone line simulator 34 and converted in the digital conversion simulator 40. If the UMD 16 is not working properly, an improper reading will be displayed or an error condition will be displayed.

CONFIGURATION III—SUSPECTED MID TEST

Referring to FIG. 5, a suspected MID 14 alone may be tested by connecting the suspected MID's 14 phone input/output port to the interface input/output port 55 of the telephone simulator 34 and connecting the monitor input/output port of the MID 14 to the monitor input/output port 58 of the UMD simulator 38. All other portions of the test apparatus 30 are in the first test configuration shown in FIG. 3.

An interrogation signal is sent to the suspected MID 14 by a manual prompting of the test apparatus 30 by start switch 114. If the suspected MID 14 commands the UMD simulator 38 to send a usage figure, the UMD simulator 38 will do so. If no usage figure is requested, of course, an error condition will be displayed on the digital display 42. In the event that a usage figure is requested from the UMD simulator 38 and an improper version of this usage figure is sent to the digital conversion simulator 40, this incorrect reading will be displayed on display 42 and the error detected therefrom. If a correct reading, typically chosen as 1234, it is seen on the digital display 42, the suspected MID 14 will have been found to be operating properly.

CONFIGURATION IV—SELF TEST

Referring to FIG. 2b, the test apparatus 30 itself can be tested by having the test apparatus 30 in a self test configuration which is the same as the second test configuration with the monitor input/output port 46 of the MID simulator 36 connected to the monitor input/output port 58 of the UMD simulator 38. With a manual prompting of the test apparatus 30 to send an interrogatory signal via start switch 114, a usage figure, typically 1234, will be displayed on the digital display 42 if the test apparatus 30 is operating properly. An error condition or an incorrect reading indicates that the test apparatus is operating improperly.

This self-test of the test apparatus 30 is rather fool proof since if any internal operation is not operating correctly, an indication that the test apparatus 30 is improperly operating will quickly be seen and the test apparatus 30 can be put in for repairs.

PREFERRED EMBODIMENT OF TEST APPARATUS

Referring to FIG. 6, it must be kept in mind that descriptions of circuits for FIGS. 6–9 indicate only the preferred embodiment of the present invention where the automatic utility meter reading system 10 is reading a water meter of the type described in U.S. Pat. No. 4,085,287 to Kullman et al. It is totally consistent with the automatic utility meter reading system 10 to read any type of utility meter, send the usage information in any of a number of ways, and send the interrogatory signals in any of a number of ways. Therefore, it is also totally consistent with the present invention of the test apparatus 30 to change its internal structure to be able to test the numerous possible automatic utility meter readings systems.

In the preferred embodiment of the present invention, the MID simulator 36 is typically created by employing an MID 14 itself. Such a MID 14 suitable for the automatic utility meter reading system 10 of FIG. 1 is described in detail in the above identified co-pending application for A Meter Interfacing Unit for Utility Meter Reading System. The MID simulator 36, therefore, typically has three input leads 51, 52 and 53 which constitute the monitor input/output port 46 of FIG. 2b. The leads 51, 52 and 53 carry a clock signal (which doubles as a voltage input line) input to the UMD 16 or UMD simulator 38, a ground connection to the UMD 16 and a data output from the UMD 16. These leads 51, 52 and 53 are switchable to either the UMD simulator 38 or the external connectors 61, 62 and 63 by a mode switch 70. The tip lead 72 and the ring lead 74 of the MID simulator 36 constitute the phone input/output port 48 of the MID simulator 36. The tip lead 72 of the MID simulator 36 can be switched into an outside tip connector 76 for connecting the test apparatus 30 to a subscriber's telephone line 12 of FIG. 1. As well, tip lead 72 may be connected to an internal power supply 80 which simulates the voltage on a telephone line and constitutes part of the telephone line simulator 34. The ring lead 74 of the MID simulator is typically grounded in an internal ground 123 of the test apparatus 30.

The 48 volts from the supply 80 when switched to the MID simulator 36 by mode switch 70, causes the MID simulator 36 to turn on because the MID 14 of the typical automatic utility meter reading system 10 is powered from the telephone line. Also, the MID simulator 36 may be connected to the UMD simulator 38 through mode switch 70. In this case, the MID simulator 36 will command the UMD simulator 38 to send a usage figure upon receiving an interrogation signal from a microprocessor circuit 90 through an interrogation signal interface 100.

When the automatic utility meter reading system 10 is used with a water meter of the type described in U.S. Pat. No. 4,085,287, the UMD simulator 38 is typically a custom manufactured integrated circuit (No. SC42689P custom manufactured by Motorola) having a clock input 64, data output 65 and ground 67 lines which together constitute the monitor input/output port 58. This integrated circuit is consistent with the circuitry described in FIG. 5 of U.S. Pat. No. 4,085,287. However, any logic circuit which can simulate the operation of whichever utility usage monitoring device 16 is used in any particular automatic utility meter reading system may be used.

Power supply 110 typically supplies 5 volts output on line 112. This output voltage is switched on momentarily to line 112 by push switch 114. This momentary power to the system initializes the microprocessor 90 which has as one of its first tasks to continue the 5 volt output to the system on line 140. If the auto/continue switch 130 is in the auto position, the microprocessor will keep the system 5 volt supply line 140 on for only a predetermined length of time, usually 5 seconds, which is long enough to send an interrogation tone and receive the usage information. This is done to decrease current consumption while in the field and to eliminate the possibility of accidentally leaving the test set on.

Also, to decrease continuous current consumption, the power supply 80, which draws the highest current in the test apparatus 30 when it up converts the 5 volts to 48 volts and 10 volts, may be selectively switched on and off by the microprocessor 90 which supplies the 5 volts on line 140 to the entire test apparatus 30. If batteries B1-B5 of FIG. 7b are getting low, this condition can be displayed on display 42 by sampling the voltage from the supply 110 over line 134.

The microprocessor circuit 90 and interrogation signal interface 100 constitute the interrogation simulator 32 of FIG. 5. The output of the interrogation signal interface 100 is connected via a capacitor C9 to the internal telephone line 104. One side of the capacitor C9 and internal ground 123 constitute the output port 50 of the interrogation signal simulator 32 of FIG. 2b. The interrogation signal interface 100 is controlled by an inhibit line 106 from the microprocessor circuit 90 which instructs when to place the interrogation signal on the internal telephone line 104. The frequency channel of the interrogation signal can be selected using frequency switches 108 and 109. Since each of the frequency switches 108 and 109 have 10 positions and frequency switch 108 is the 1's position and frequency switch 109 is the 10's position, 99 different frequencies may be selected ranging from about 60 to about 3500 Hertz. In one embodiment, the 99 frequencies range from 320 to 3155 Hertz with each discrete frequency being no less than 5 percent but not more than 10 percent higher than the next lower frequency. Of course, any number of frequency channels may be selected and still be consistent with the present invention.

It might also be noted that switches 108 and 109 may double as program switches which program the microprocessor 90 to perform 99 selectable functions which might be needed for particular automatic utility meter reading systems.

The internal telephone line 104, ground 123 and the 48 volt output from the power supply 80 constitute the telephone line simulator 34 of FIG. 5. The internal telephone line 104 and ground 123 are connected in parallel with outside telephone line connectors tip 72 and ring 78. The internal telephone line 104 together with the internal ground 123 constitute both the interface input/output line 55 and the signal input/output line 57 of the telephone line simulator 34 of FIG. 2b.

An incorrect polarity of installation of an outside subscriber's telephone line 12 will cause LED D15 to light but no damage will result to the test apparatus 30 because the path of the incorrect polarity telephone line current will be confined to the incorrect polarity line 84 which becomes conductive only upon receiving an incorrect polarity through diode D13.

The usage data interface 120 and microprocessor 90 constitute the digital conversion simulator 40 of FIG. 2b which typically has a display 42. The input port 44 of the digital conversion simulator 40 is the internal ground 123 and one side of the capacitor C29. The usage information from the internal telephone line 104 is conducted through capacitor C29 to a usage data interface 120 where it is amplified and converted into digital representations which are then sent to the microprocessor 90 over line 124. The amplified usage data can be switched to a speaker 126 so that the operator can hear the data being transmitted over the internal telephone line 104. A visual representation of the usage data is performed through data LED D14 which blinks in correspondance with the pulsed data from the MID 14 or MID simulator 36 as the case may be.

The test apparatus 30 may be put in a automatic mode or a continuous mode through switch 130. When the switch 130 is closed, the test apparatus is in the automatic mode and when the switch 130 is open, the test apparatus 30 is in the continuous mode. When the test apparatus is in the automatic mode, the pushing of the start switch 114 will cause the test apparatus to turn on for a predetermined length of time, usually about 5 seconds. In this time, an interrogation signal has been sent and an attempt to read the usage data has been made. When in the continuous mode, the test apparatus 30 will stay on continuously after the switch 114 is pushed and a continuous interrogation signal will be sent until the test apparatus is switched back to the automatic mode by switch 130. The automatic mode of operation is intended to conserve battery power when the test apparatus 30 is in field use.

With the mode switch 70, of FIGS. 2a and 2b, in the self test configuration of FIG. 2b the following actions occur: after the start switch 114 is depressed, simultaneously an interrogation signal is sent over line 104 from the interrogation signal interface 100, and, the power supply 80 supplies the line 104 with 48 volts. The supplying of the line 104 with 48 volts activates the MID simulator 36 and the interrogation signal received by the MID simulator 36 causes the MID simulator 36 to command a usage figure from the UMD simulator 38. The usage figure is sent over line 104 and received in the microprocessor circuit 90 through the usage data interface 120. The usage figure thus received is displayed on display 42 to indicate whether the test apparatus 30 is operating properly.

Now referring to FIGS. 7a, 7b and 7c, the power supply 110 may be powered from an AC outlet through transformer T1 which charges batteries B1-B5 which typically are nickle-cadmium batteries which power the test apparatus 30 in field use. The push switch 114, when depressed, momentarily pulls the input of an inverter integrated circuit U6 toward ground 123 which, in turn, causes relay K1 to close through transistor Q7 and diode D24. The closing of relay K1 causes the collector of transistor Q5 to be connected to the battery supply B1-B5. Normally, the transistor Q5 is conductive through the operation of comparator integrated circuit U4 which has a non-inverting input driven high through resistor R39 and an inverting input which is normally lower in voltage because of the voltage drop through transistor Q5.

When the emitter of transistor Q5 receives the voltage impressed on Q5's collector, inverters U7 and U8 cause the reset-not line 114 to go high, resetting processors U20 and U21 shown in FIGS. 8a, 8b, 8c and 8d. If the battery voltage goes below a particular value, the operation of comparator U5 and associated components will send over line 134 a low battery indication to exclusive OR gate U24 shown in FIG. 8a which indicates the low battery condition on the display 42 also shown in FIG. 8a. The auto/continuous switch 130 grounds the input of inverter U2 leaving the inverter's U2 output high. The output of inverter U2 is connected to the CA1 lead of processor U20 shown in FIG. 8a. When the auto/continuous switch 130 is in the continuous position, the inverter's U2 output is held low and this condition is also communicated to U20 of FIG. 8a.

The UMD simulator 38, as previously discussed, is, in the preferred embodiment of the present invention, typically a custom manufactured integrated circuit U17 (No. SC42689P manufactured by Motorola). This integrated circuit U17 simulates the operation of the water meter device described in U.S. Pat. No. 4,085,287. Of course, any circuit can be used as a UMD simulator 38 which acts to simulate the particular UMD 16 which is to be simulated in the test apparatus 30.

The MID simulator 36 typically is a MID 14 itself mounted within the test apparatus 30. Both the UMD simulator 38 and MID simulator 36 are typically interconnected by a mode switch 70 which is typically a ganged rotary switch with center contacts SA6, SA9, SB6, SB9, SC6, and SC9. Each center contact has four switch positions which correspond with INTERNAL, EXTERNAL, METER, and TEST functional positions.

When the test apparatus is in the INTERNAL functional configuration, mode switch 70 switches out the MID simulator 36 from the circuit, switches the UMD simulator 38 to the outside connectors 61, 62 and 63 and switches the internal 48 volt supply to the tip and ring terminals so that a MID can be tested without an actual phone line. The tip and ring terminals are also connected through internal telephone line 104 to amplifier U16 which communicates this fact to U21 of FIG. 8c. In the EXTERNAL functional configuration, mode switch 70 again switches the UMD simulator 38 to the outside connectors 61, 62 and 63 and switches the MID simulator 36 out of the circuit. Now, however, an external phone line is needed to power a MID under test so that a complete installation can be tested as powered by the phone line to which it is connected. In the METER functional configuration, the mode switch 70 switches the UMD simulator 38 out of the circuit, switches the leads 51, 52 and 53 of the MID simulator 36 to the outside connectors 61, 62 and 63, switches the 48 volt supply voltage to the tip 72 and ring 74 inputs of the MID simulator 36, and switches tip and ring 72 and 74 to outside connectors 76 and 78, respectively. In the TEST functional configuration, mode switch 70 switches internal telephone line 104 to the MID simulator 36 and connects the MID simulator 36 to the UMD simulator 38. However, it must be noted that in the TEST position, the test apparatus 30 itself is being tested, and, that although internal telephone line 104 is connected to the MID simulator 36, an outside subscriber's telephone line is not connected to tip 76 and ring 78 connectors.

Integrated circuits U12, U13, U14, U15 and associated components comprise a typical usage data interface 120. The data LED D14 and speaker 126 are shown. The integrated circuits U9, U10, U11 and associated components comprise a typical interrogation signal interface 100. Diodes D7, D8, D9, and D10 comprise a voltage spike protection circuit where voltage spikes of either positive or negative polarity coming from a subscriber's telephone line 12 which are conducted over internal telephone line 104 are supressed to ground 123.

Referring to FIGS. 8a, 8b, 8c and 8d, the typical microprocessor 90 and display 42 of the present invention are shown. Processor U21 is typically a 6802 processor integrated circuit helped by an interfacing processor integrated circuit U20 which is typically a 6821. The RAM for the microprocessor 90 is typically two static RAM integrated circuits U19 and U23. The programming for the processor U21 is typically housed in an EPROM U22 which is easily changed to control the processor U21 to perform the necessary functions of any of the possible automatic utility meter reading systems which are possible. The display 42 is typically an LCD display driven by a display driver integrated circuit U18.

Figure 9:
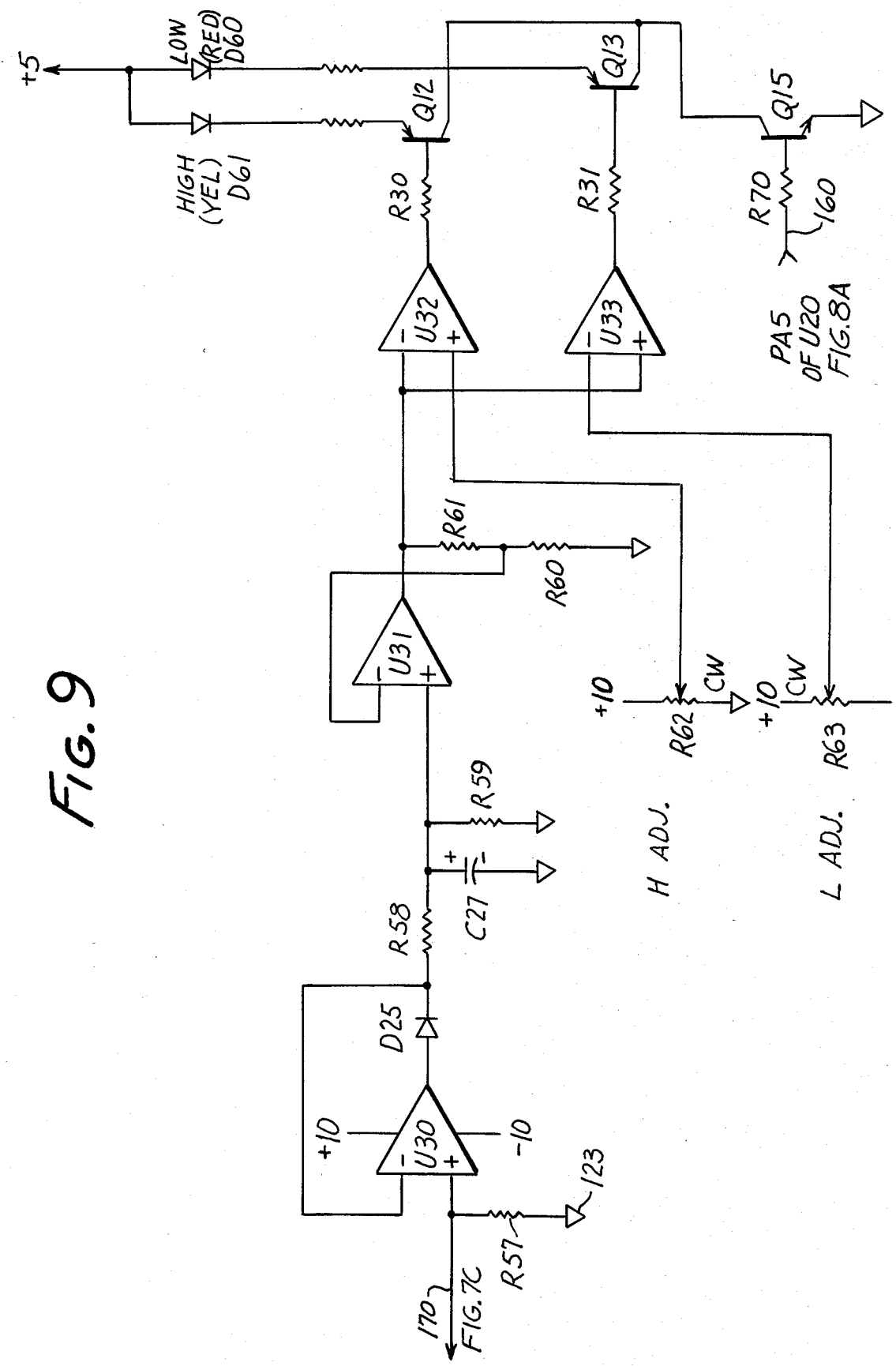

Referring to FIG. 9, a means for indicating whether the output voltage of a suspected MID 14 is above or below a predetermined voltage range is seen. U30, U31, U32 and U33 comparators compare the voltage level appearing on the outside tip 72 and ring 78 connectors with a high voltage developed through potentiometer R62 which represents the high end of the predetermined voltage range. This voltage level appearing on the outside connectors 76 and 78 is also compared to a low voltage developed through potentiometer R63 which represents the low end of the predetermined voltage range.

When a signal is received by transistor Q15 from the processor U21, the voltage level appearing on connectors 76 and 78 are compared to the high and low ends of the predetermined voltage range. If the voltage appearing on connectors 76 and 78 is higher than the high end of the range, LED D61 will light for the duration of the sending of the usage figure, thus indicating an incorrect voltage level. If the voltage appearing on connectors 76 and 78 is lower than the low end of the range, LED D60 will light for the duration of the sending of the usage figure, thus indicating an incorrect voltage level. Therefore, a user of the test apparatus 30 will know when a suspected MID 14 is not outputting the proper voltage level and the MID 14 may be adjusted or replaced.

OPERATION OF THE PREFERRED TEST APPARATUS

The preferred embodiment of the test apparatus 30 of the present invention can be operated in several test configurations to test the automatic utility meter reading system 10 of FIG. 1. Reference to the following chart 10 is helpful to understand the connections and modes of the test apparatus 30 required for each test.

| CONFIG-URATION | SUSPECTED COMPONENT(S) | POSITION OF MODE SWITCH | PROPER OPERATION | IMPROPER OPERATION |
| --- | --- | --- | --- | --- |
| I | MID, UMD (in system and powered by tel. line) | EXTERNAL | UMD READING | ERROR READING |
| | (powered by testset) | INTERNAL | | |
| II | UMD | METER | UMD READING | ERROR READING |
| III | MID | INTERNAL | UMD SIM. READING | ERROR READING |
| IV | TEST APPARATUS | TEST | UMD SIM. READING | ERROR READING |

First, a suspected installation of a MID 14 and UMD 16 can be checked for proper transmit voltage level by connecting tip 72 and ring 78 of the test apparatus 30 to the tip and ring of the suspected MID 14. The frequency channel of the particular interrogation signal for the suspected MID 14 must be programmed through switches 108 and 109 of FIG. 8a. Since the checking is typically done in the field, the test apparatus 30 should be put in the auto mode through auto/continuous switch 130. Switch 70 should be in the EXTERNAL function position since the installation is powered from an EXTERNAL power line and the start switch 114 should be depressed. The data LED D14 should come on momentarily and the meter reading should appear on the display 42. If either D60 or D61 of FIG. 9 light, the voltage level from the suspected MID 14 is lower or higher respectively than the predetermined voltage range chosen to optimize the performance of the MID's 14. The MID 14 can then be adjusted or replaced.

Second, a suspected UMD 16 alone may be tested by connecting the corresponding leads from the suspected UMD 16 to outside connector leads 61, 62 and 63, setting the frequency channel to the position required by the MID simulator 36, switching auto/continuous switch 130 in the auto position, setting mode switch 70 to the METER functional position, and pushing the start switch 114. If an error message appears on the display 42 or an incorrect reading appears, the suspected UMD 16 is improperly operating. If the meter reading is correct, the suspected UMD 16 is operating properly.

Third, a suspected MID 14 and UMD 16 combination may be tested by connecting the MID's tip and ring leads to the outside connectors 76 and 78, setting the frequency channel to the proper frequency channel for the suspected MID 14, setting mode switch 70 to the INTERNAL functional position, and pushing the start switch 114. The data LED D14 should come one while the usage figure is transmitted. If an incorrect meter reading is read on the display 42 or if an error message is seen, either or both of the suspected MID 14 and UMD 16 are operating improperly.

Fourth, a suspected MID 14 alone may be tested by connecting the MID's tip and ring to the outside connectors 76 and 78, connecting the monitor input/output port of the MID 14 to outside connectors 61, 62 and 63, setting the frequency channel to the proper frequency channel of the suspected MID 14, setting the auto/continuous switch 130 to the auto position, setting mode switch 70 to the INTERNAL functional position, and pushing the start button. The data LED D14 should light and the predetermined usage figure from the UMD simulator 38 (typically 1234) should appear on the display 42. If not, then the suspected MID 14 is known to be inoperative.

Fifth, the installation of an MID 14 and UMD 16 may be tested from a remote location by connecting the tip and ring from the subscriber's telephone line 12 connected to the suspected MID 14 to outside connectors 76 and 78, setting the frequency channel to the proper one for the suspected MID 14, setting the auto/continuous switch 130 to the auto position, setting mode switch 70 to the EXTERNAL functional position, and pushing the start button. The reading on the display 42 should correspond to the reading on the UMD 16 at the installation. Also, the MID 14 alone may be tested from the subscriber's telephone line 12 at the installation location by connecting the suspected MID's 14 monitor input/output port leads to the outside connections 61, 62 and 63. When the start switch 114 is pushed, the reading should be that of the UMD simulator 38.

Sixth, the test apparatus 30 may be self-tested by setting the frequency channel to the proper channel for the MID simulator 36, setting the auto/continuous switch 130 to the auto position, setting mode switch 70 to the TEST functional position, and pushing the start switch 114. If the reading is other than that of the UMD simulator 38 or if an error condition is displayed on display 42, the test apparatus 30 is known to be inoperative.

It must be noted that an error condition may be noted on display 42 in any of a number of ways, however, it has been chosen in the preferred embodiment to have the error condition displayed as a series of four segment, non-recognizable characters.

The auto/continuous switch 130 may be put in the continuous mode when it is desired to send a continuous interrogation signal. This is sometimes desirable in new installations of the automatic utility meter reading system 10 where the condition of the subscriber's telephone line 12 must be checked. The reversed polarity LED D15 will light if any tip and ring connections of an outside subscriber's telephone line 12 have been reversed on the connectors 76 and 78.

Accompanying herewith and incorporated by reference is the listing of the program contained in the EPROM U22 of FIG. 8 referenced in the foregoing specification. The listing consists of 25 printed pages.

While the present invention has been described as applied to the automatic meter reading system of FIG. 1, it should be noted that the present invention is equally applicable to other automatic meter reading systems. Therefore, the preceeding description of the preferred embodiment of the present invention should not be considered limiting, but, instead, the scope of the present invention should be determined from the the following claims plus their equivalents.

What is claimed is:

1. In an automatic utility meter reading system having component parts which monitor utility usage information, send interrogation signals over the telephone lines, send the monitored utility usage information over telephone lines responsive to the receiving of interrogation signals over the telephone lines, and receive the utility usage information from the telephone lines, a test apparatus for testing component parts of the automatic utility meter reading system comprising:

a first means for simulating the operation of the components of the automatic utility meter reading system which monitor the utility usage information;

a second means for simulating the operation of the components of the automatic utility meter reading system which send the interrogation signals over the telephone lines;

a third means for simulating the operation of the components of the automatic utility meter reading system which send the monitored utility usage information over the telephone lines responsive to receiving the interrogation signal; and, a fourth means for simulating the operation of the components of the automatic utility meter reading system which receive the utility usage information;

the first, second, and fourth means being interconnectable to test the operation of the components of the automatic utility meter reading system which send the utility usage information over the telephone lines responsive to receiving the interrogation signals;

the second, third, and fourth means being interconnectable to test the components of the automatic utility meter reading system which monitor utility usage information; and, the second, and fourth means being interconnectable to test the combination of components of the automatic utility meter reading system which monitor the utility usage information and send the utility usage information over the telephone lines responsive to receiving the interrogation signals.

2. The testing apparatus in accordance with claim 1 further including a fifth means for simulating the operation of a telephone line.

3. The testing apparatus in accordance with claim 2 in which the first, second, third, fourth and fifth means are interconnectable to test the test apparatus.

4. The testing apparatus in accordance with claim 2 in which the second, fourth and fifth means are interconnectable to test the combination of components of the automatic utility meter reading system which monitor utility usage information and send the utility usage information over the telephone lines responsive to receiving interrogation signals from the telephone lines.

5. The testing apparatus in accordance with claim 4 in which the combination of components of the automatic utility meter reading system which monitor utility usage information and send the utility usage information over the telephone lines responsive to receiving interrogation signals from the telephone lines is tested from a central location.

6. In a automatic utility meter reading system which sends utility information over telephone lines and having a plurality of meter interface devices, each having a phone input/output line connected to a telephone line and a monitor input/output line connected to a monitor input/output line of a utility usage monitor for transmitting a usage figure to the interface device upon command therefrom, the interface devices sending alternating current representations of the usage figures transmitted from the utility usage monitors upon command from the interface devices over a plurality of discrete telephone lines in response to receiving interrogation signals, a means for sending at least one distinct alternating current interrogation signal over each of the plurality of discrete telephone lines, a means for receiving the usage representations and converting the alternating current representations into a plurality of digital representations, a test apparatus for testing the function of a suspected meter interface device, utility usage monitor, telephone line, and the test apparatus comprising:

a first means for simulating the operation of the means for sending at least one alternating current interrogation signal, the first means having an output line for carrying at least one interrogation signal;

a second means for simulating the operation of the telephone line, the second means having a signaling input/output line and an interface input/output line;

a third means for simulating the operation of the means for receiving and converting the alternating current representations into digital representations, the third means having an input line;

the first, second and third means being interconnectable in a first test configuration to test a suspected interface device and utility usage monitor for one of the following conditions, proper operation and improper operation;

a fourth means for simulating the operation of the meter interface device the fourth means having a monitor input/output line and a phone input/output line and the first, second, third and fourth means being interconnectable in a second test configuration to test a suspected utility usage monitor for one of the following conditions, proper operation and improper operation; and, a fifth means for simulating the operation of the utility usage monitor, the fifth means having a monitor input/output line and the first, second, third, fourth and fifth means being interconnectable to test the suspected test apparatus for one of the following conditions, proper operation and improper operation.

7. The test apparatus in accordance with claim 6 in which a suspected meter interface device and utility usage monitor may be tested by connecting the first, second and third means together in the first test configuration in which the output line of the first means is connected to the signaling input/output line of the second means, and the input line of the third means being connected to the signaling input/output line of the second means, the interface input/output line of the second means being connected to the phone input/output line of a suspected meter interface device to enable testing of the suspected interface device and utility usage monitor.

8. The test apparatus in accordance with claim 7 in which a suspected utility usage monitor may be tested by connecting the first, second, third and fourth means in the second test configuration in which the first, second and third means are connected in the first test configuration and the phone input/output line of the fourth means is connected to the interface input/output line of the second means, the monitor line of the fourth means being connected to the monitor input/output line of the suspected utility usage monitor to enable the suspected utility usage monitor to be tested.

9. The test apparatus in accordance with claim 8 in which the test apparatus may be tested by connecting the first, second, third and fourth means in the second test configuration and connecting the monitor input-/output line of the fifth means to the monitor input/output line of the fourth means.

10. The test apparatus in accordance with claim 7 in which a suspected meter interface device may be tested for one of the following conditions, proper operation and improper operation by connecting the first, second and third means in the first test configuration, connecting the phone input/output line of the suspected interface device to the interface input/output line of the second means, and connecting the monitor input/output line of the suspected interface device to the monitor input/output line of the fifth means.

11. The test apparatus in accordance with claim 7 in which the suspected interface device may be tested in one of the following conditions, connected to its discrete telephone line and not connected to its discrete telephone line.

12. The test apparatus in accordance with claim 7 in which the interface input/output line of the second means is connected to the tip and ring of a discrete telephone line at a location remote from the interface device and utility usage monitor in order to test the discrete telephone line, interface device and utility usage monitor.

13. The test apparatus in accordance with claim 7 further including a means for determining if the alternating current representation signal from the suspected interface device is in any one of the following conditions, higher in voltage level relative to a predetermined range of acceptable levels, within the predetermined range of voltage level which are acceptable levels, lower in voltage level than the predetermined range of voltage levels.

14. The test apparatus in accordance with claim 6 in which the first means includes a means for selectably producing any one of a plurality of single tone bursts as an interrogate signal.

15. The test apparatus in accordance with claim 14 in which the plurality of tone bursts range from about 60 to about 3500 Hertz in frequency.

16. The test apparatus in accordance with claim 15 in which the frequency of a tone burst is one of the following frequencies, 500 Hertz, 810 Hertz and 1270 Hertz.

17. The test apparatus in accordance with claim 15 in which the plurality of interrogate frequencies is 99 frequencies in a range of from 320 to 3155 Hertz with each discrete frequency being no less than 5 percent but not more than 10 percent higher than the next lower frequency.

18. The test apparatus in accordance with claim 6 further including a means for indicating the existance of a condition of reversed tip and ring telephone line wires.

19. The test apparatus in accordance with claim 6 further including a means for preventing damage to the test apparatus, the tested telephone line, the interface device and the utility usage monitor from reversed tip and ring telephone line wires.

20. The test apparatus in accordance with claim 6 further including a means for indicating one of the following conditions, the utility usage monitor is transmitting its usage figure upon command from its interface device and the utility usage monitor is not transmitting its usage figure upon command from its interface device.

21. The test apparatus in accordance with claim 6 further including a means for displaying an interrogate signal channel designation.

22. The test apparatus in accordance with claim 6 further including a means for displaying the usage figure transmitted from a utility usage monitor.

23. The test apparatus in accordance with claim 6 further including a means for displaying a usage figure transmitted from the fifth means for simulating the operation of the utility usage monitor.

24. The test apparatus in accordance with claim 6 further including a means for displaying the frequency of an interrogation signal sent from one of the following sources, the test apparatus and the means for sending at least one distinct alternating current interrogation signal.

25. The test apparatus in accordance with claim 6 in which the first means simulates an interrogation signal for a selectable, predetermined length of time.

26. The test apparatus in accordance with claim 12 further including a means for determining if the alternating current representation signals from the suspected interface device are in any one of the following conditions, higher in voltage level relative to a predetermined range of acceptable levels, within the predetermined range of voltage levels which are acceptable levels, lower in voltage level than the predetermined range of voltage levels.

* * * * *